United States Patent
Kähler

[11] Patent Number: 5,804,014
[45] Date of Patent: Sep. 8, 1998

[54] PROCESS FOR PROVIDING A FILTER INSERT

[75] Inventor: Kai Kähler, Hamburg, Germany

[73] Assignee: Detroit Holding Limited, Cork, Ireland

[21] Appl. No.: 663,100

[22] PCT Filed: Dec. 30, 1994

[86] PCT No.: PCT/DE94/01559

§ 371 Date: Jun. 28, 1996

§ 102(e) Date: Jun. 28, 1996

[87] PCT Pub. No.: WO95/17944

PCT Pub. Date: Jul. 6, 1995

[30] Foreign Application Priority Data

Dec. 30, 1993 [DE] Germany .................. 43 45 122.5

[51] Int. Cl.$^6$ .......................... B01D 29/07; B01D 29/31; B31F 53/00
[52] U.S. Cl. .......................... 156/204; 156/227; 156/229
[58] Field of Search .................... 156/227, 474, 156/204, 229, 312, 495, 548; 55/521, 497; 210/493.1, 493.3

[56] References Cited

U.S. PATENT DOCUMENTS

| | | | |
|---|---|---|---|
| 3,531,920 | 10/1970 | Hart | 55/497 |
| 4,111,733 | 9/1978 | Periers | 156/227 |
| 4,798,575 | 1/1989 | Siversson | 156/474 |
| 5,028,331 | 7/1991 | Lippold | 55/521 |
| 5,066,400 | 11/1991 | Rocklitz et al. | 55/521 |
| 5,290,447 | 3/1994 | Lippold | 55/521 |

FOREIGN PATENT DOCUMENTS

| | | |
|---|---|---|
| 0377419 | 7/1990 | European Pat. Off. . |
| 0382330 | 8/1990 | European Pat. Off. . |
| 8118562 | 4/1982 | France . |
| 3037019 | 6/1982 | Germany . |
| 3903730 | 8/1990 | Germany . |
| 4038966 | 6/1992 | Germany . |
| 4126126 | 2/1993 | Germany . |
| 4206407 | 9/1993 | Germany . |

*Primary Examiner*—Richard Crispino
*Attorney, Agent, or Firm*—Spencer & Frank

[57] ABSTRACT

A process and apparatus is provided for producing a filter insert for a fluid filter. The insert is comprised of filter material having a number of fold walls arranged in a zigzag-shaped continuous fold. Adjacent fold walls are connected to one another and rest on one another at least in part by means of an adhesive spacer. A strip of the filter material is provided with indentations which determine positions of fold edges. The adhesive spacers are applied to at least corresponding areas of those parts of the strip of filter material which will become adjacent fold walls when the filter insert is complete. The strip of filter material is folded at the indentations in partial steps, including a first partial step of folding the filter material into folds at a small spacing, and a second partial step of pulling the folds apart again by a predetermined amount so that at least some of the adhesive spacers have a height which is not constant in a direction at right angles to the fold edges.

15 Claims, 7 Drawing Sheets

PROCESS FOR PROVIDING A FILTER INSERT

BACKGROUND OF THE INVENTION

The invention relates to a process for producing a filter insert comprised of filter material having a number of fold walls arranged in a zigzag-shaped continuous fold, adjacent fold walls being connected to one another and resting on one another at least in part by means of an adhesive spacer, wherein the a strip of the filter material is provided with indentations which determine positions of fold edges; the adhesive spacers are applied to at least corresponding areas of those parts of the strip of filter material which will become adjacent fold walls when the filter insert is complete; and the strip of filter material is folded at the indentations. The invention additionally relates to an apparatus for carrying out the process.

Filter inserts of the above types are used to remove contamination from a fluid flowing through a filter, particularly air or industrial gasses, but theoretically liquids as well. At present, filter elements consisting of a micro fibre fleece, particularly glass fibres, are predominantly used in air filters.

In order to increase the effective filter area relative to the inflow surface of the air filter which forms a filter element or filter area, the filter medium is folded in a zigzag shape so as to produce a number of folds adjoining one another via fold edges, which are located at an acute angle to the walls of the folds and through which the medium to be purified flows at right angles to the direction of the fold edges.

As a result of the depositing of material, and particularly the settling of larger particles, on the inflow side of the filter, turbulence in the inflowing fluid, slight irregularities in the folds, etc, inhomogeneities may occur in the fluid flow as the fluid flows through the filter, thereby subjecting the fold arrangement to strong mechanical alternating stresses and possibly bringing about deformation of the fold arrangement.

In order to hold the folds at a specified distance from one another and mechanically stabilise the fold arrangement of the filter insert, the folds are therefore provided with projections protruding from the plane or the told walls, as described for example in U.S. Pat. No. 3,531,920 or, according to another special embodiment, in German Patent Document DE 41 26 126 A1, in such a way that the projections of adjacent fold walls abut on one another and the fold walls support one another. In order that the fold walls are directed at an inclined angel to the incoming fluid, ie. the fold layers are substantially triangular in cross section, the projections must also be approximately triangular or trapezoidal in cross section.

These arrangements have proved suitable for filter inserts with a fold height up to about 100 mm, with relatively tightly packed folds. Beyond this fold height and with larger fold spacings, however, the depth of impression required is so great that, with conventional filter materials, there is the risk of the folds being punched through, thereby unacceptably increasing the number of rejects.

It is also known from German Patent Document DE 40 38 966 to place separate spacers with the same function on the fold walls or to insert such spacers therein. The spacers may be adhesive aggregates, particularly in fibre form, as mentioned as a possibility in the specification referred to above or as illustrated in German Patent Document DE 30 37 019 A1. In addition to acting as spacers, they also have the effect of connecting the fold walls and thus further increasing the rigidity of the filter insert.

The adhesive is applied before the folding of the filter material onto the flat strip, and the fold walls are adhered by the contact of the adhesive threads with one another during the folding operation. This solution is therefore only suitable for very densely packed folds. In addition, the fold layers formed in this way tend to have a meandering configuration in cross section, which does not lead to optimum flow qualities.

German Patent Document DE 39 03 730 A1 describes how an adhesive thread which joins the fold layers together and stabilizes them and which may be applied to the edge area after folding, is combined with impressions in the fold walls. This solution results in mechanically very stable filter inserts, but is subject to essentially the same restrictions as the solutions without adhesive in terms of the fold height and fold spacing which can be achieved.

German Patent Document DE 42 06 407 describes how the fold edge area of a previously folded length of filter material is covered with a fine web of adhesive threads in order to join the folds together and stabilise the filter insert. This solution is no longer practical for larger fold spacings since the fine adhesive web cannot produce a sufficiently stable attachment of fold edges which are spread further apart and the filaments of the web "sag" (particularly when applied from below to a folded material located above during the manufacturing process) and do not assume a defined position relative to the fold edges.

From European Patent Document EP 0 377 419 A1 an arrangement is known in which adhesive aggregates of varying sizes (larger at the top and smaller at the bottom) located in the top and bottom areas of a fold wall arrangement which is to be formed are to be used to adhere walls of folds in a manner such as to produce a substantially triangular cross section of fold. However, larger fold spacings and heights cannot be achieved by this method because extremely bulky adhesive aggregates would be required which would greatly reduce the effective filter surface.

SUMMARY OF THE INVENTION

It is an object of the invention to provide a process of the kind described, with which it is possible to produce filter inserts of considerable height and/or considerable fold spacing, and an apparatus for carrying of this process. The above and other objects are accomplished according to the invention by the provision of a process for producing a filter insert for a fluid filter, the insert comprised of filter material having a number of fold walls arranged in a zigzag-shaped continuous fold, adjacent fold walls being connected to one another and resting on one another at least in part by means of an adhesive spacer, the process comprising the steps of: providing a strip of the filter material with indentations which determine positions of fold edges; applying the adhesive spacers to at least corresponding areas of those parts of the strip of filter material which will become adjacent fold walls when the filter insert is complete; and folding the strip of filter material at the indentations in partial steps, including a first partial step of folding the filter material into folds at a small spacing, and a second partial step of pulling the folds apart again by a predetermined amount so that at least some of the adhesive spacers have a height which is not constant in a direction at right angles to the fold edges.

According to a further aspect of the invention there is provided an apparatus for producing a filter insert of the above type, the apparatus comprising: a supply device for supplying filter material; an adhesive applicator for applying adhesive to the filter material supplied by the supply device for forming the adhesive spacers between adjacent fold walls when the filter material is folded; and a folding and pulling device located downstream of the adhesive applicator and comprising a first device including a first belt arrangement traveling at a first speed for folding the filter material to form the adhesive spacer connecting the fold walls and transporting the folded filter material, and a second device including a second belt arrangement traveling at a second speed higher than the first speed for at least one of further transporting and opening out the folded filter material and increasing an initial fold width of the folded filter material.

The invention includes the idea of initially joining an adhesive aggregate applied to a fold wall for connecting and reinforcing to adjacent fold walls by close contact between this and the fold wall or by bringing two dots or threads of adhesive applied to the two fold walls into such close contact with one another, in the same manner, that they bond to form an adhesive aggregate. The adhesive aggregate adhering to the adjacent fold wall or the bonded adhesive aggregate is pulled apart and thereby stretched in cross section in the direction perpendicular to the fold walls by pulling apart the fold wall to which it adheres firmly and finally the adhesive is cured in the stretched state, corresponding to a comparatively large spacing between the fold walls. After curing, the fold walls are then fixed in the desired spacing relative to one another, i.e. joined together and at the same time support against one another at a fixed spacing.

This may advantageously be achieved within the scope of the advancing movement of the filter material and the folded insert which will in any case occur during manufacture if the bundle of folds formed in the first partial step (with a relatively small fold spacing) is moved during the second partial step at a higher speed than the advance in the first partial step.

Particularly large fold spacings can be achieved if depressions and/or elevations are stamped into the plane of at least some of the fold walls in order to reinforce the folds in such a way that the depressions and/or elevations of adjacent fold walls are held at a spacing from one another and join together at least in parts by means of the separate spacer (the adhesive aggregate). However, this is not absolutely necessary —the fold walls may also be spaced solely by the separate spacer, particularly the adhesive applied.

The process operates favourably if the layers of adhesive have a larger dimension (height) at least along part of their longitudinal extent perpendicular to the plane of the adjacent fold walls then the average dimension parallel to this plane (width), particularly if the layers of adhesive become flatter in accordance with the cross sectional tapering of a fold towards the "point" of the fold. For this purpose, the quantity of adhesive applied to the strip of material per unit of length can be controlled so that the adhesive aggregates have a non-constant amount of adhesive per unit of length in the direction of their longitudinal extent, particularly so that the quantity of adhesive is reduced towards what will eventually be the "points" of the folds, For the performance of the filter it is advantageous if the adhesive is applied to the smallest possible area of the filter material, more particularly in a substantially linear pattern, i.e., in a pattern having a minimal width relative to the length of the layer of adhesive.

It is also possible for an adhesive layer of appreciable height to be provided only in that area of the fold where the fold walls are supposed to be spaced well apart, whereas the area close to the "points" of the fold is not adhered.

If there are elevations or depressions in the filter material, these may be formed, on the one hand, so that their height is substantially constant in the direction of longitudinal extent —more or less in the manner of a substantially constant grooving of the filter material—and on the other hand in such a way that their height decreases towards what will eventually be the "point" of the fold. What is essential is that the mutual spacing of the fold walls is not primarily determined by the indentations in the filter material itself but by the additional spacers. The embossing of the filter material may contribute to this, but serves primarily to stifffen the material and thereby stabilise it during manufacture.

The process according to the invention may be used, in particular, to produce filter inserts which form an element having the shape of a box or a hollow cylinder and are required to, for example, in the natural gas and petroleum industries, in energy saving, in ventilation and air conditioning technology or in vehicle construction for use as air or gas filters.

The quantity of adhesive applied per unit of length of the material can advantageously be altered by varying the quantity of adhesive delivered from a applicator device per unit of time. However, it is also possible, in addition or alternatively, to provide a number of applications of adhesive one above the other on the area envisaged for the formation of the adhesive layer, along part of the longitudinal extent. Moreover, the quantity of adhesive applied per unit of length of the material can be altered by varying the relative speed between the strip of material and the outlet opening of an applicator device.

The second partial step of folding—widening the fold spacing—may possibly have to be carried out after a certain time has elapsed after the first partial step (depending on the adhesive, filter material and conditions), this length of time being such that predetermined curing or gradual cross-linking of the adhesive may take place.

It should be borne in mind that, in the present embodiments and in the claims, a filter material can be understood to mean all the conventional filter materials or those used for specific fluids, particularly fibre fleeces consisting of cellulose, glass, mineral or ceramic fibres, fine-mesh fabric, either impregnated or not, and the adhesives may be the materials which can be used together for materially connecting such materials, particularly adhesives in the narrower sense, but also thermoplastic or foam materials or the like which adhere to the filter material.

The substantially zig-zag shaped continuous folding referred to also includes fold arrangements in which the cross section of the fold at right angles to the fold edges is substantially trapezoidal or the fold edges are rounded.

Other advantageous features of the invention are described more fully hereinafter, together with the description of preferred embodiments of the invention, with reference to the figures.

DETAILED DESCRIPTION OF THE INVENTION

Figure 1A:
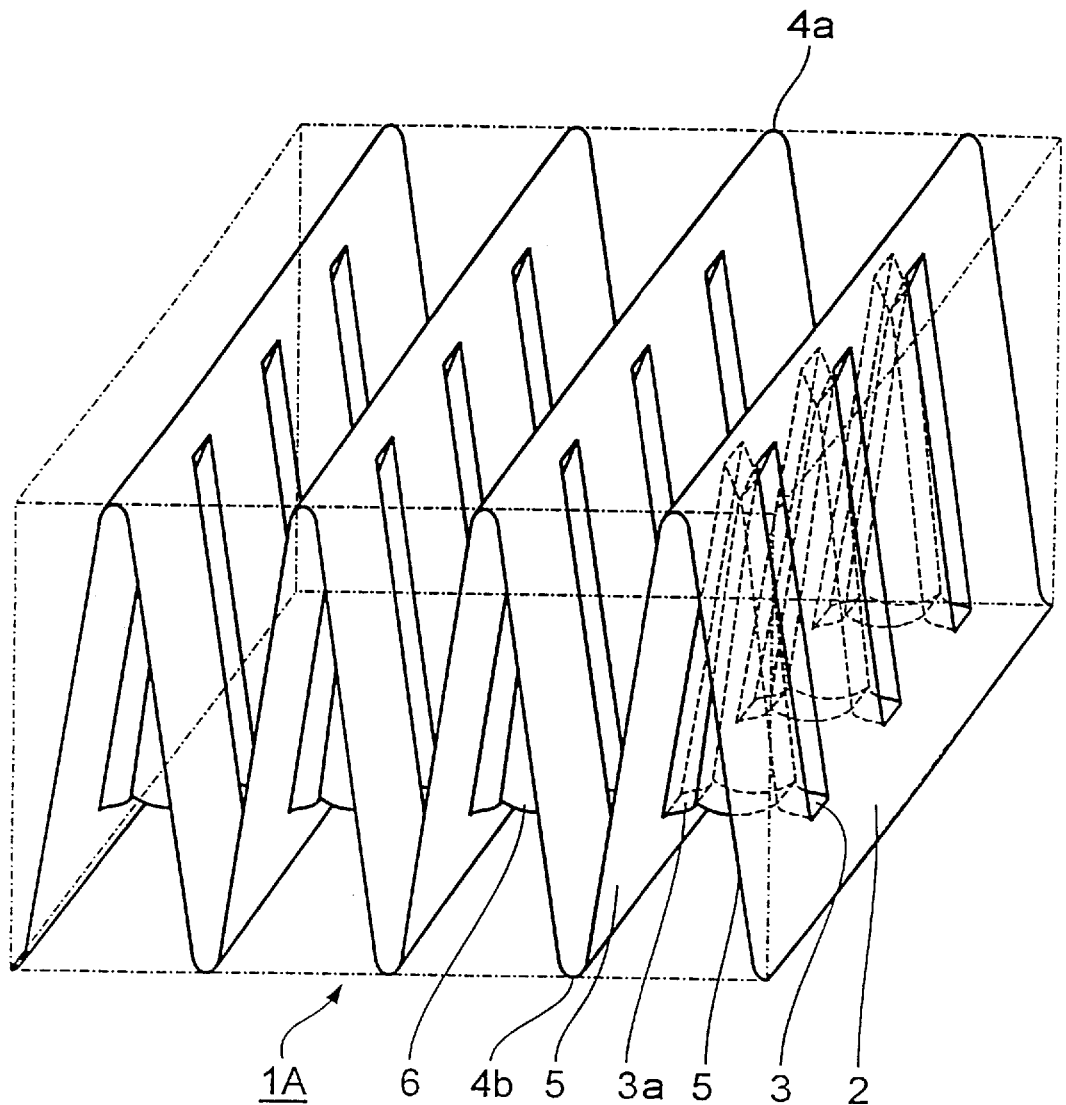
Figs. 1a and 1b are perspective diagrammatic views of a filter insert prepared according to one embodiment of the invention.

FIG. 1a shows, in highly simplified form, a filter insert 1a which is substantially box shaped in its outer form, consisting of a glass fibre filter fleece 2 impregnated with synthetic resin, which is provided with corrugation-like depressions 3 stamped into one side and is folded approximately in a zig-zag shape with (slightly rounded) upper and lower fold edges 4a and 4b, so that the embossed depressions 3 in any two adjacent fold walls 5 face one another. The depressions or corrugations 3 increase in height towards the lower fold edges 4b, i.e., as the widths of opening of the folds increase.

The fold spacings of the folds are so great (in order to achieve defined parameters of use) that the top surfaces of opposing depressions 3 do not touch one another.

On each of the top surfaces 3a is provided a layer of adhesive 6 which becomes thicker towards the lower fold edges 4b. The adhesive aggregates on opposing depressions 3 are joined together, as a result of which once the adhesive has cured, the opposing depressions 3 and hence the fold walls into which they are embossed are firmly attached and substantially rigidly supported on one another. This produces a filter insert 1a which is mechanically largely resistant to compression.

Figure 1B:
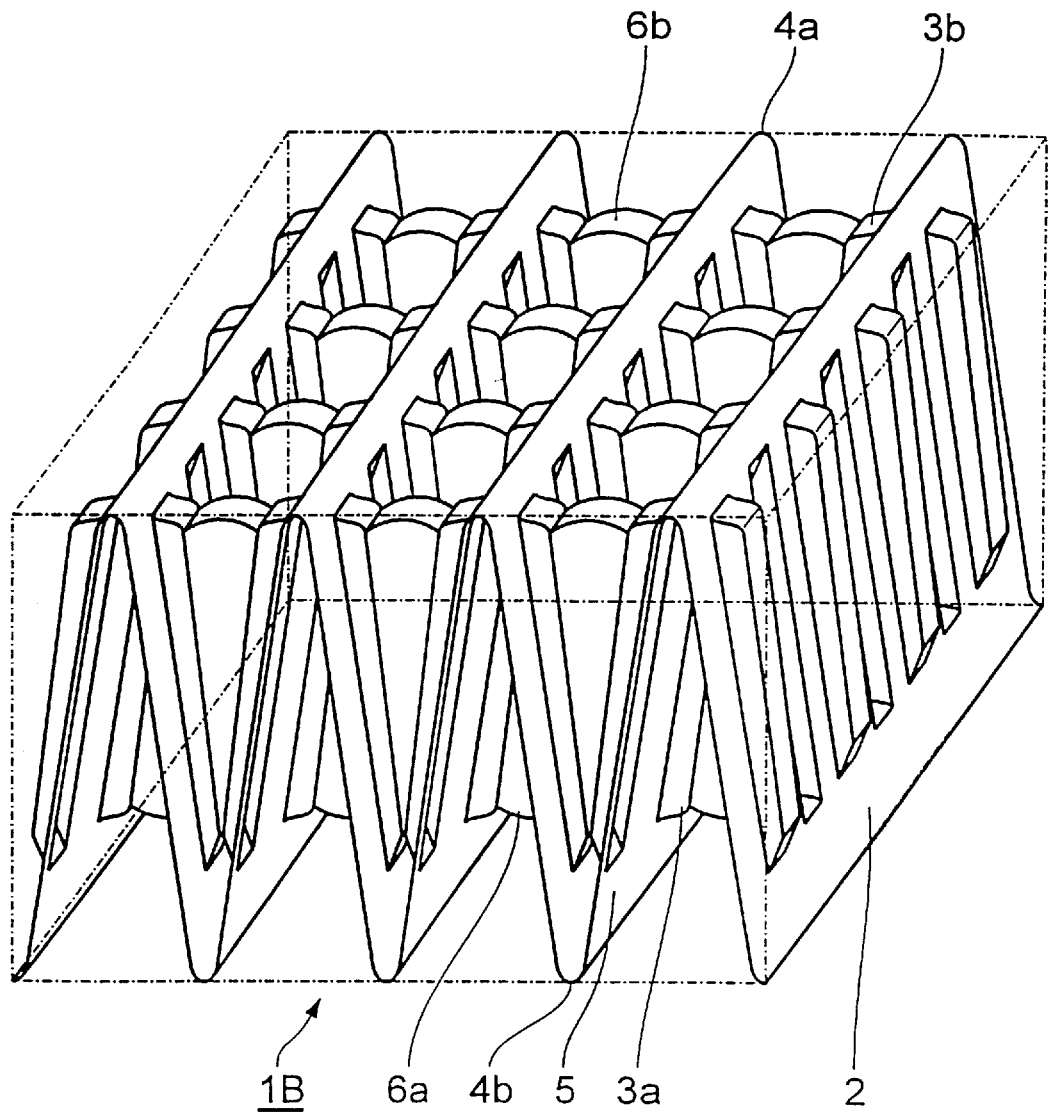

FIG. 1b shows a filter insert 1B which is modified from the embodiment in FIG. 1a and wherein corrugations 3a and 3b and spacers (adhesive aggregate) 6a and 6b are is provided on both sides of each fold wall 5; see also the description of FIG. 3d hereinafter.

Figure 2:
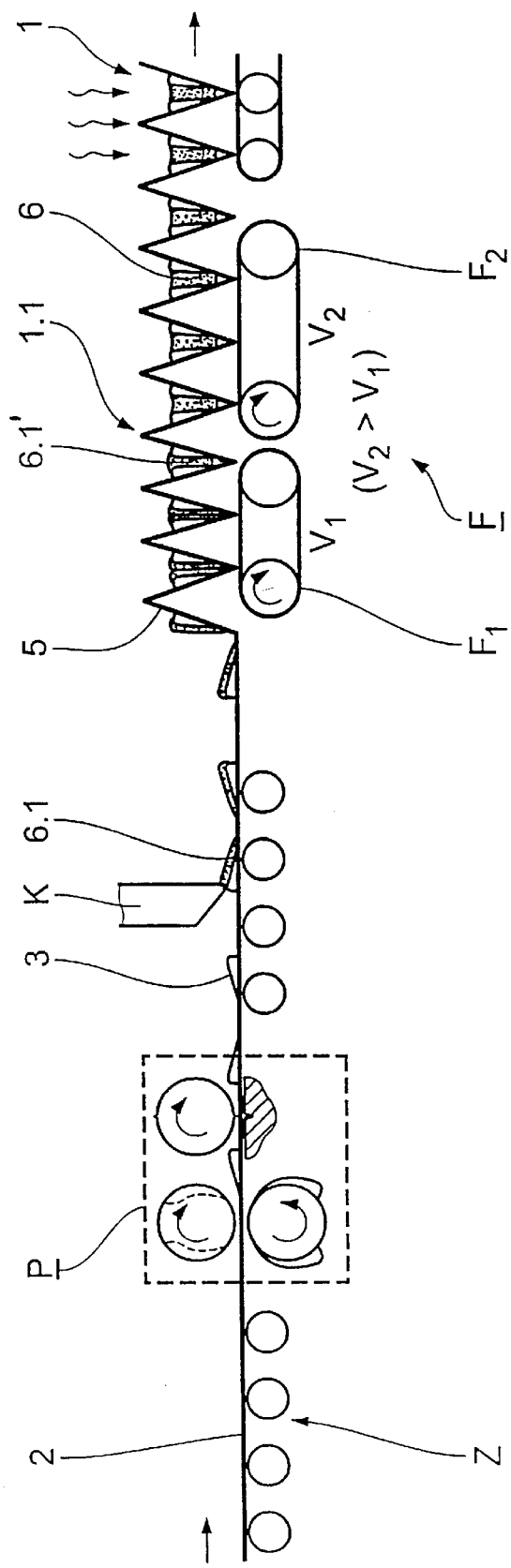
FIG. 2 is a diagrammatic view of the apparatus for carrying out the process according to one embodiment.

FIG. 2 shows, in a schematic diagram, the essential steps of forming a folded filter insert of the kind shown in FIG. 1 and the most important elements of the apparatus used for this purpose.

A (quasi-endless) strip of the filter material 2 is led over a run of roller Z first to an embossing device P having a plurality of embossing rollers for embossing the told lines for subsequent folding and the reinforcing corrugations 3 and then to an adhesive applying device K having a plurality of hot melt adhesive applicator modules with a central supply of adhesive, in which the top surfaces of the corrugations 3 are provided with a thread of paste-type hot melt adhesive 6.1. The hot melt adhesive penetrates into the filter material to some degree and is thereby bonded thereto.

As the strip 2 of material is transferred to a first belt system F1 which, as shown by a clockwise arrow, is driven to travel at a speed $V_1$, the material is put into tight folds, the corrugations 3 in adjacent fold walls 5 being move towards one another and the as yet uncured layers of adhesive 6 on adjacent corrugations 3 being brought into such close contact that they are fused together to form adhesive aggregates 6.1. A primary bundle of folds 1.1 is formed having a small fold spacing, but wherein the folds are not yet fixed.

This bundle of folds 1.1 is then passed to a second belt system F2 which, as shown by a clockwise arrow, is driven to run at a speed $V_2$ exceeding the first speed $V_1$, as result of which a tensile force is generated between the individual folds and the folds between which the adhesive 6.1' is still not yet cured are pulled apart again to some extent. As a result, the threads of adhesive 6.1' adhering firmly to the filter material 2 on both sides are stretched in the direction of travel of the bundle of folds and thus substantially at right angles to the direct of the fold edges, so that their cross sectional area takes on a shape 6 ranging from rectangular to double-T shaped (or bone-like).

In this configuration, the threads of adhesives are cured (as indicated by the wavy arrows), after which the corrugations 3 suitably spaced by the cured adhesive layers are supported on one another consequently the fold walls 5 are also fixed. Thus, the bundle of folds 1 is produced with the large told spacing required.

Figure 3A:
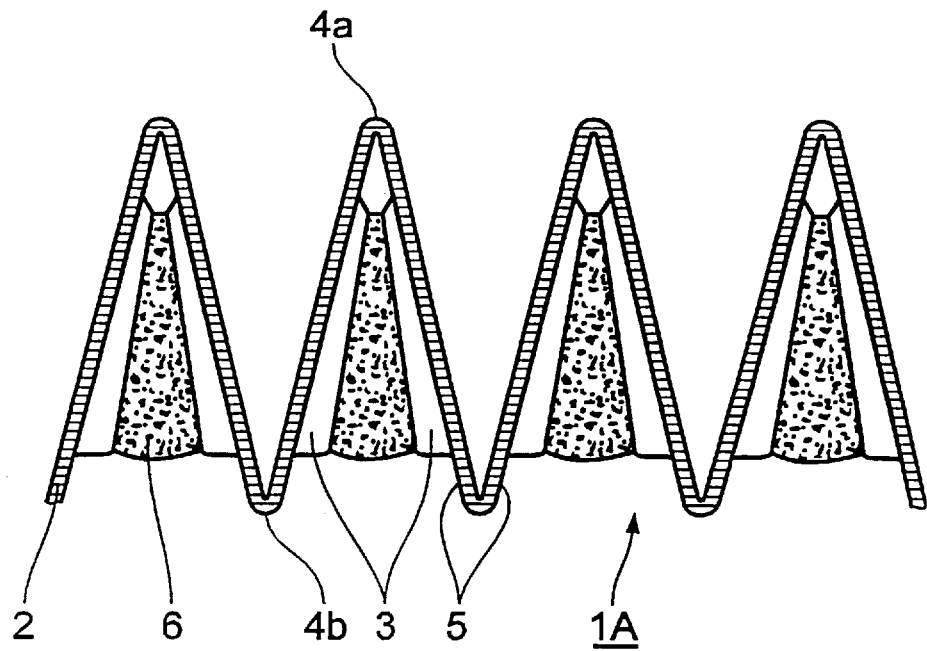
FIG. 3a to 3f are diagrammatic cross sectional views of the fold arrangements of filter inserts (perpendicularly to the fold edges) prepared according to embodiments of the invention.

FIG. 3a shows a cross sectional view of the fold arrangement of the filter insert 1a shown in FIG. 1a in a cutting plane parallel to the longitudinal extent of the spacers. Here, the increase in height both of the corrugations (depressions) 3 and also of the layers of adhesive 6 in the direction from the upper to the lower fold edges can very clearly be seen.

Figure 3B:
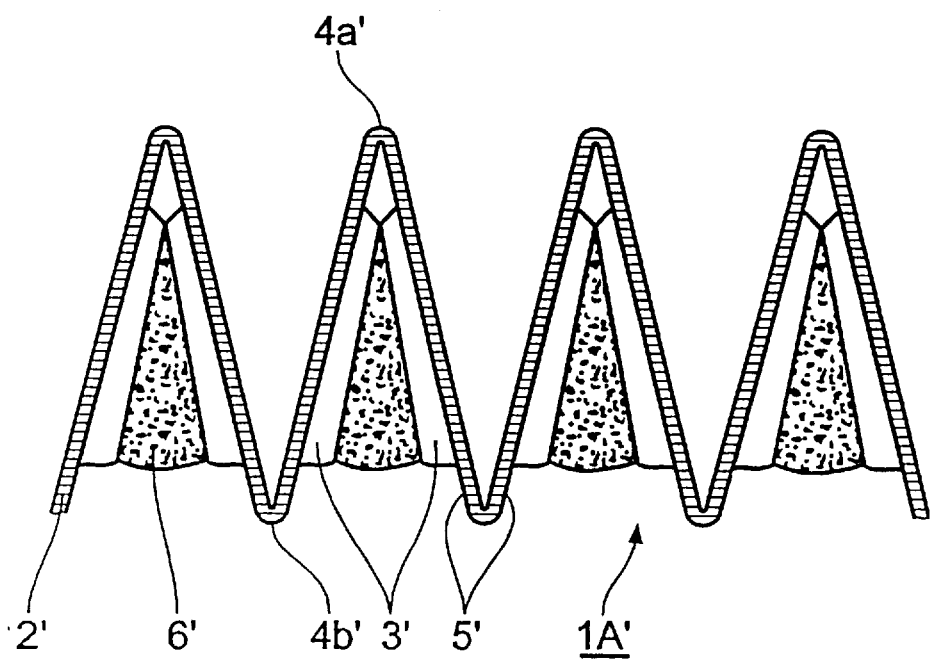

In an alternative embodiment, FIG. 3b shows a filter insert 1A', in which, in a basic arrangement similar to FIG. 3a, the fold walls are constructed as walls 5' having corrugations 3' of substantially constant height over their longitudinal extent, whilst the increase in the thickness of the adhesive layers 6' from the upper fold edge area 4a' to the lower fold edge area 4b' is more marked here than in the arrangement according to FIG. 3a, although the fold angle remains substantially the same.

Figure 3C:
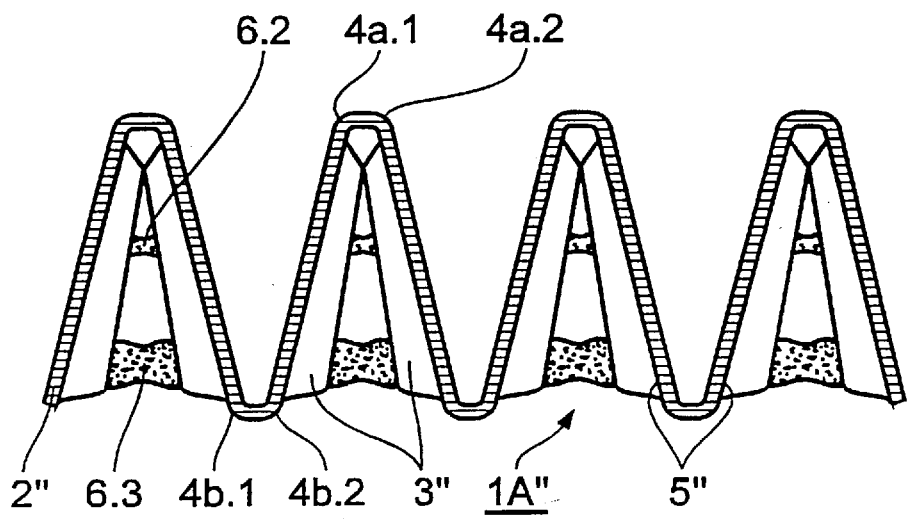

FIG. 3c shows a filter element 1A" according to another embodiment, wherein the cross section of the folds are trapezoidal, so that two fold lines 4a.1, 4a.2 (upper fold edges) and 4b.1, 4b.2 (lower fold edges) are provided between the successive told walls 5". The fold walls 5" have corrugations 3" embossed therein, extending from the upper fold edges 4a.1, 4a.2 to the lower fold edges 4b.1, 4b.2 and having a constant height over this distance. In the upper part the corrugations 3" each have a relatively small dot of adhesive 6.2 and close to their lower end, adjacent to the lower fold edges 4b", they have a substantially bulkier, hemispherical adhesive aggregate 6.3, in accordance with the larger fold spacing at this point. The individual adhesive aggregates 6.2 and 6.3 on the corrugations 3" of adjacent fold walls are fused together, so that the fold walls 5" are thereby fixedly connected to one another.

Figure 3D:
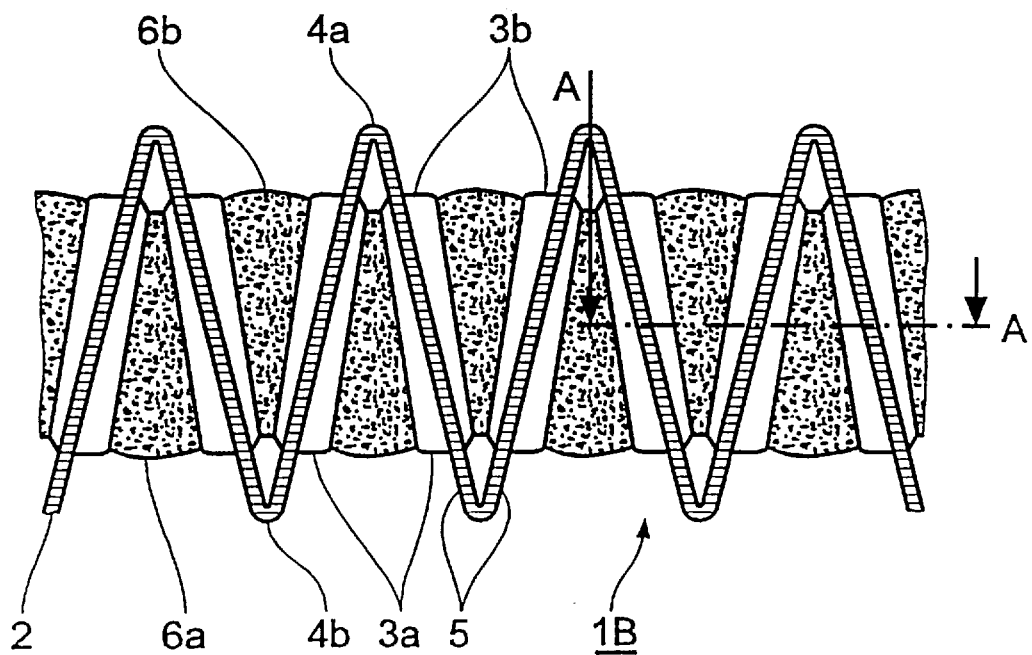

FIG. 3d shows a cross sectional representation of the filter element 1B according to FIG. 1b, in which fold walls are provided which have corrugations 3a and 3b on both sides, i.e. both depressions and elevations. (The other reference numerals from FIGS. 1a and 3a have been retained in the interests of simplicity.) The opposing elevations and depressions 3a and 3b are joined together—as in FIG. 3a—via a combined adhesive aggregate, whilst the all-over attachment of adjacent fold walls produces a filter bundle with a high degree of compressive and tensile strength which is therefore also highly resistant to deformation even in strong currents with turbulent components or strong changes in pressure in the course of time.

Figure 3E:
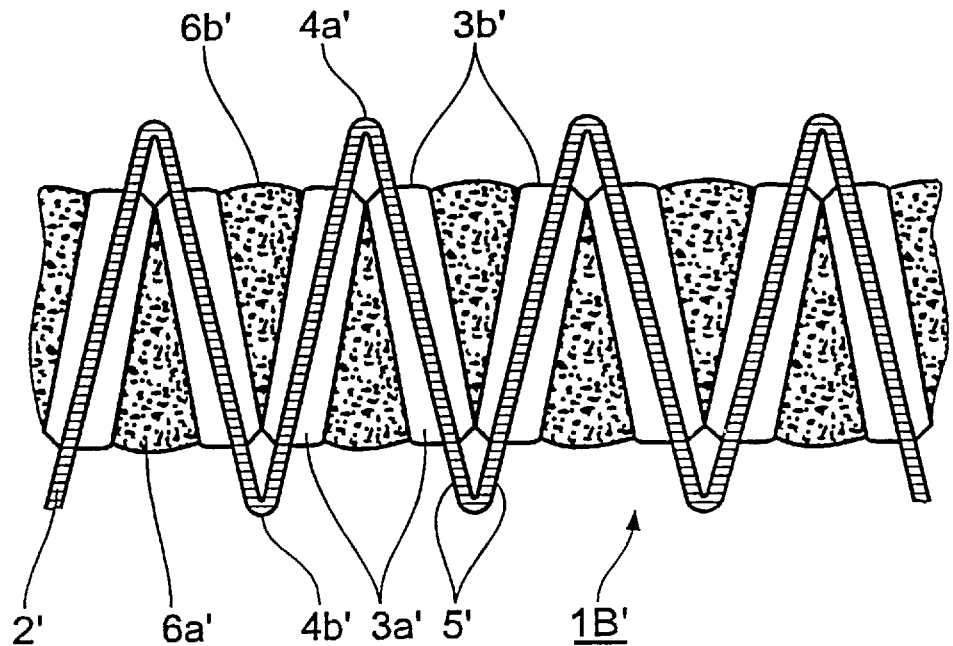
Figure 3F:
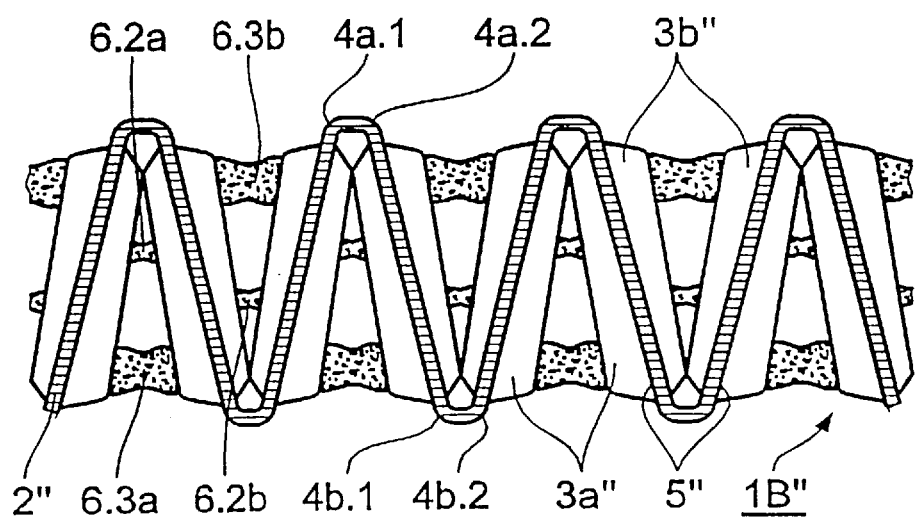

An analogous embodiment with corrugations and adhesive aggregates provided on both sides of each fold wall is also possible in the arrangements according to FIGS. 3b and 3c. These embodiments are shown in FIGS. 3e and 3f, in which the reference numerals for similar components correspond to those in the preceding figures, and there is no need for any separate description here.

Figure 4A:
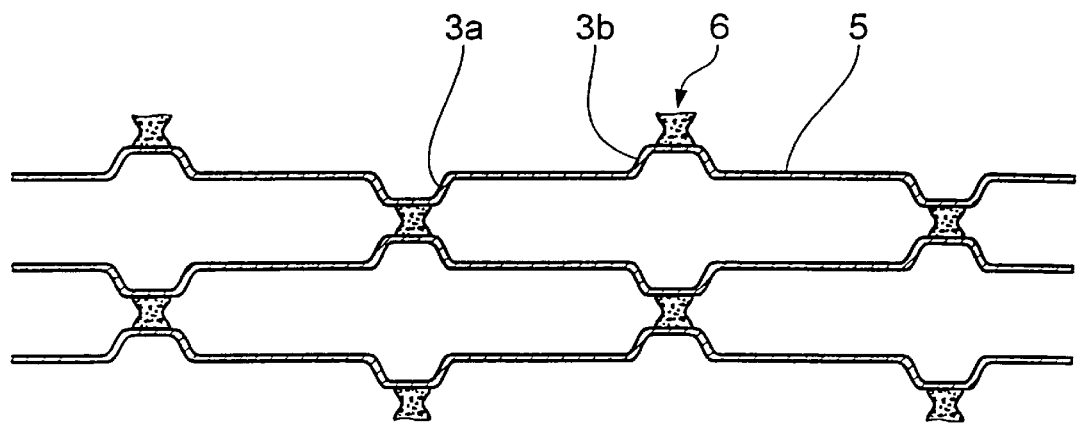
FIGS. 4a and 4b are diagrammatic cross sectional views of fold arrangements (parallel to the fold edges) prepared according to embodiments of the invention.

FIG. 4a shows a cross sectional view of two folds of a fold arrangement according to FIG. 3d in a plane parallel to the fold edge portions (along the line A—A in FIG. 3d) in an embodiment in which the reduced width in the centre part of the adhesive aggregates lying flat on the tops of the corrugations can be seen.

Figure 4B:
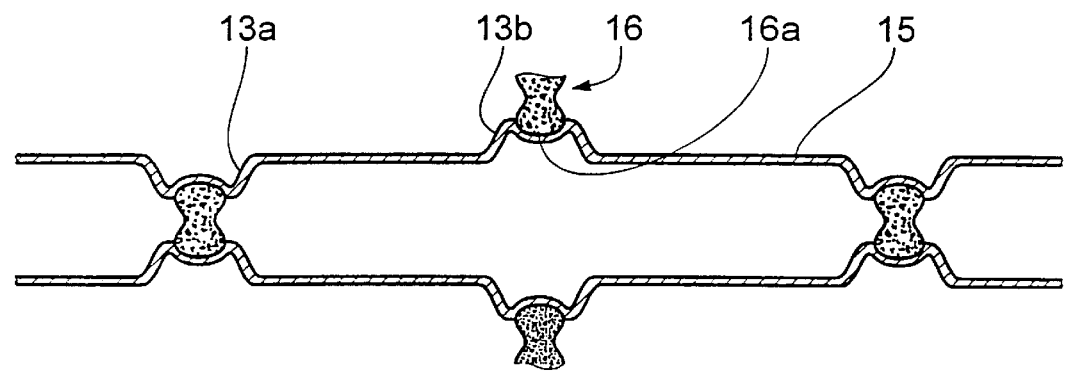

FIG. 4b shows a modification of this arrangement, in which corrugations 13a and 13b in fold walls 15 are profiled so as to have a central longitudinal groove 16a. A ribbon of adhesive 16 of relatively small width and with its contact surface to the corrugation being precisely defined by the walls of the groove, ie. substantially semi-circular in cross section, is placed in this groove 16a. For the purpose of connecting facing corrugations, only one application of adhesive is provided, precisely in the form of the ribbon 16 in one of the grooves 16a which are adjacent as a result of the (subsequent) folding process. The final bone-like cross sectional shape of the spacer is formed as a result of the fact that this ribbon is first brought into contact with the opposing groove and bonded, according to the process in FIG. 2, and then stretched in the transverse direction whilst still plastic.

The arrangement according to FIG. 4b with inherently profiled corrugations has the advantage that the application of adhesive is carried out with minimal and precisely defined lateral spread, so as to avoid smearing on the filter material, so as to maximise the effective filter surface.

Embodiments similar to those described above can be used in a similar manner for hollow cylindrical filter insert; as a modification of the process outlined in FIG. 2, the hollow cylindrically closed shape of the fold bundle has to be produced before the adhesive aggregates are cured. This is appropriately done by carrying out the second step of the folding process as the step of fanning out the fold bundle (which is still box-shaped after the first step) to produce the hollow cylindrical shape or by including this procedure.

The embodiments of the invention are not restricted to those described hereinbefore by way of example. Rather, a number of alternatives are possible, particularly in term of the geometry and combination of shapes embossed in the filter material and the layers applied thereto, which make use of the solution described, albeit in a fundamentally different form.

I claim:

1. A process for producing a filter insert for a fluid filter, the insert comprised of filter material having a number of fold walls arranged in a zigzag-shaped continuous fold, adjacent fold walls being connected to one another and resting on one another at least in part by means of an adhesive spacer, the process comprising the steps of:

providing a strip of the filter material with indentations which determine positions of fold edges;

applying the adhesive spacers to at least corresponding areas of those parts of the strip of filter material which will become adjacent fold walls when the filter insert is complete; and folding the strip of filter material at the indentations in partial steps, including a first partial step of folding the filter material into folds at a small spacing such that the adjacent fold wall edges are at a small spacing from each other and the adhesive spacers contact each other, and a second partial step of pulling the folds apart again by a predetermined amount to extend the adhesive spacers so that at least some of the adhesive spacers have a height which is not constant in a direction at right angles to the fold edges, then curing the adhesive spacers.

2. The process as defined in claim 1, wherein the filter insert has a substantially box-shaped outer shape, and the first partial step includes advancing the folds at a first speed and the second partial step includes advancing the folds at a second speed that is greater than the first speed to form the substantially box-shaped outer shape.

3. The process as defined in claim 1, wherein the filter insert has a substantially hollow cylindrical outer shape, and the second partial step includes fanning out in a ring-shape the folds formed in the first partial step.

4. The process as defined in claim 1, further comprising embossing at least one of depressions and elevations into a plane of at least a part of the fold walls for reinforcing the folds so that the at least one of the depressions and elevations are connected to one another at least in certain areas by the adhesive spacers.

5. The process as defined in claim 4, wherein the embossing step includes embossing the filter material so that a height of a at least one of the depressions and elevations is substantially constant in a direction of their longitudinal extent.

6. The process as defined in claim 4, wherein the embossing step includes embossing the at least one of the depressions and elevations in the filter material so that when the filter is formed adjacent fold walls rest against one another in such a way that a height of the at least one of the depressions and elevations decreases towards a common edge of the adjacent fold walls.

7. The process as defined in claim 1, including providing the adhesive spacers, in at least a part of their longitudinal extent, with a height which exceeds their average width.

8. The process as defined in claim 1, including forming the adhesive spacers flatter, with respect to a cross sectional tapering of a fold, towards an edge of a fold which adjacent fold walls joined together by the adhesive spacers have in common.

9. The process as defined in claim 1, wherein the applying step includes applying the adhesive spacers only in an area of the filter material so that when the folds are formed the adhesive spacer will be located in a fold where the adjacent fold walls are at a considerable spacing from one another.

10. The process as defined in claim 1, wherein the applying step includes altering a quantity of an adhesive applied per unit of length to the strip of filter material so that the adhesive decreases continuously towards an indentation which determines an edge of a fold that is common to two fold walls which are to be connected by the adhesive spacer.

11. The process as defined in claim 10, wherein the altering step includes varying the quantity of adhesive that is delivered from an applicator device per unit of time.

12. The process as defined in claim 10, wherein the applying step includes applying a plurality of layers of adhesive one on top of another on an area provided for forming adhesive spacers.

13. The process as defined in claim 10, wherein the altering step includes varying a relative speed between the strip of material and an outlet opening of an applicator device used to deliver the adhesive.

14. The process as defined in claim 1, wherein the applying step includes applying an adhesive that forms the adhesive spacer in a substantially linear configuration so that a width of the adhesive is less than a length of the adhesive.

15. The process as defined in claim 1, including carrying out the second partial step after a pause following the first partial step, which pause is sufficient to allow one of a predetermined curing and gradual cross linking of the adhesive spacers.

* * * * *

UNITED STATES PATENT AND TRADEMARK OFFICE
CERTIFICATE OF CORRECTION

PATENT NO.: 5,804,014
DATED : September 8, 1998
INVENTOR(S): Kai KÄHLER

It is certified that error appears in the above-identified patent and that said Letters Patent is hereby corrected as shown below:

On the title page:

Item [73] change "Detroit Holding Limited, Cork, Ireland" to read --"JACOBI" Systemtechnik GmbH, Weissig, Germany--.

Signed and Sealed this

Fourteenth Day of September, 1999

*Attest:*

Q. TODD DICKINSON

*Attesting Officer*     *Acting Commissioner of Patents and Trademarks*